United States Patent Office 3,234,124
Patented Feb. 8, 1966

3,234,124
SEQUESTRATION OF METAL IONS
Riyad R. Irani, Florissant, Mo., assignor to Monsanto Company, a corporation of Delaware
No Drawing. Filed Oct. 18, 1962, Ser. No. 231,596
9 Claims. (Cl. 210—38)

The invention relates to methods for sequestering or inhibiting the precipitation of metal ions from aqueous solutions and, more particularly, to the use of amino tri (lower alkylidenephosphonic acids) or their salts as sequestering agents for this purpose.

It is well understood that generally the ability of a sequestering agent to sequester or inhibit the precipitation of metal ions effectively is quite dependent on pH conditions. For example, sequestering agents which are usually considered quite effective in sequestering metal ions in alkaline solutions are usually found to be markedly less effectively in acid solutions. In addition, it has usually been found that many sequestering agents are really only truly effective within a narrow pH range. An outstanding example of the above is the ability of the sequestering agent sodium gluconate to effectively sequester $Fe^{III}$ ions only at a pH of 12 or above. As can be appreciated, therefore, a sequestering agent which is effective over a wide range of pH values and in both an acid and alkaline solution would be an advancement in this art.

Therefore, a object of this invention is to provide a method for sequestering or inhibiting the precipitation of metal ions from aqueous solutions.

Another object of this invention is to provide a sequestering agent which is effective in sequestering or inhibiting the precipitation of heavy metal ions in acid or alkaline aqueous solutions.

A still further object of this invention is to provide a sequestering agent which is effective in sequestering or inhibiting the precipitation of $Fe^{III}$ ions in acid or alkaline solutions.

Other objects will become apparent from a reading of the following detailed description.

It has been found that amino tri(lower alkylidenephosphonic acids) or their salts, said acids being of the following formula:

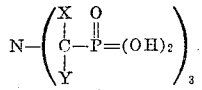

wherein X and Y represent hydrogen or a lower alkyl group, are effective sequestering agents as will be more fully discussed hereinafter.

Compounds illustrative of the invention are: amino tri(methylphosphonic acid), amino tri(ethylidenephosphonic acid) and amino tri(isopropylidenephosphonic acid.)

The amino tri(lower alkylidenephosphonic acids) and their salts may be prepared by various means, one of which comprises as a first step the preparation of the corresponding esters by reacting under reactive conditions ammonia, a compound containing a carbonyl group such as an aldehyde or ketone, and a dialkylphosphite. The free amino tri(lower alkylidenephosphonic acids) and their salts may be prepared by hydrolysis of the esters.

Generally stated, this invention relates to the use of amino tri(lower alkylidenephosphonic acids) or their salts as sequestering agents in sequestering or inhibiting the precipitation of heavy metal ions from aqueous solutions.

It is to be understood that although the free acids are preferred the sodium salts of amino tri(lower alkylidenephosphonic acids) and in particular the penta sodium salt, have proven to be quite effective. Other alkali metal salts, such as potassium, lithium and the like, as well as mixtures of the alkali metal salts may be used. In addition, any water-soluble salt, such as the ammonium salt, e.g., $N(CH_2PO_3(NH_4)_2)_2(CH_2PO_3HNH_4)$, and the amine salts, e.g., $$N(CH_2PO_3(N(CH_3)_2)_2)_2(CH_2PO_3HN(CH_3)_2)$$

which exhibit the characteristics of the alkali metal salt may be also used to practice the invention.

The sequestering agents of the instant invention exhibit, in addition to their sequestering ability, the highly beneficial properties of being highly water soluble and hydrolytically stable, that is, having a substantial resistance to hydrolysis or degradation under various pH and temperature conditions.

Although the novel sequestering agents of the invention are of general utility whenever it is desired to sequester or inhibit the precipitation of metal ions from aqueous solutions, they are especially effective in such applications as presented in the following table.

TABLE 1

| Use | Reason for use | Problem metal ions |
|---|---|---|
| Liquid soaps and shampoos. | Clarity | $Fe^{+++}$. |
| Bar soaps | Color | $Fe^{+++}$. |
| Scouring wool cloth | Dye leveling | $Fe^{+++}$. |
| Cotton kier boiling | do | $Fe^{+++}$. |
| Cotton dyeing | do | $Fe^{+++}$. |
| Cotton bleaching | Bleach stabilization. | $Cu^{++}$, $Fe^{+++}$, $Mn^{++}$. |
| Metal cleaning compounds. | Removal of rust prevents ppt. | $Fe^{++}$ and $Fe^{+++}$. |
| Rubber and plastics (compounding and polymerization). | Trace metal contamination. | $Cu^{++}$, $Fe^{++}$ and $Fe^{+++}$. |
| Pulp and paper | do | $Fe^{++}$ and $Fe^{+++}$. |

The amount of the sequestering agent necessary to be effective varies with, inter alia, the type and amount of problem metal ions, pH conditions, temperature and the like, but in any event only minor amounts are usually sufficient. For example, for many of the uses listed above in Table 1 concentrations of less than about 1% by weight of water are usually sufficient.

To illustrate the invention, the following examples are presented.

Example 1

Into a conventional 3-nicked, 3-liter flask fitted with a reflux condenser, stirrer and thermometer was added 600 grams of diethyl phosphite and 127.5 grams of 29% aqueous ammonnia solution. The flask was placed in an ice bath and after the mixture had become cooled to about 0° C. 325 grams of 37% aqueous formaldehyde solution was added. The flask was removed from the ice bath and heated with the reaction occurring at about 100° C. After the reaction was completed the flask was allowed to cool to room temperature and the reaction products were extracted with benzene and separated by fractional distillation. Hexaethyl aminotri(methylphosphonate) distilled between 190°–200° C. at a pressure of .1 mm. and was obtained in a quantity of 184 grams. The following are the results to enable a comparison between the calculated percent constitutents and found percent constituents.

Calculated: 36.78% C, 7.30% H, 3.53% N, 20.01% P.
Found: 38.54% C, 7.76% H, 3.00% N, 19.89% P.

$$N(CH_2P(O)(OH)_2)_3$$

was prepared by hydrolysis of a portion of the foregoing prepared ester. In a flask similar to that described above 40 grams of the ester was refluxed with about 200 ml. of concentrated hydrochloric acid for a period of about 24 hours. The free acid, a sirupy liquid, crystallized on prolonged standing (about 1 week) in a dessicator. The yield was 20 grams. The equivalent weight of the free acid, by titration, was found to be 62 as compared with the calculated value of 59.8.

*Example 2*

Penta sodium aminotri(methylphosphonate)

$$N-(CH_2P(O)_3Na_2)_2(CH_2P(O)_3HNa)$$

was prepared by dissolving the free acid obtained in Example 1 in 140 ml. of 10% NaOH solution and evaporating the aqueous solution to dryness to about 140° C. with the anhydrous form of the salt being formed.

In order to illustrate the sequestering ability of the amino tri(lower alkylidenephosphonic acids) and their salts, the following tests and comparisons were made with the indicated results. The testing procedure used unless otherwise indicated consisted of pipetting an aliquot volume of 2.5% stock ferric chloride solution into a beaker and adding thereto enough sodium hydroxide or hydrochloric acid to give the desired pH. The solution was stirred for 15 minutes, followed by the addition of an aliquot of 2.5% sequestering agent solution. After final pH adjustment with sodium hydroxide or hydrochloric acid, the solution was shaken for 48 hours to reach equilibrium. The solution was centrifuged at 11,500 r.p.m. for 90 minutes to remove colloidal Fe(OH)$_3$ and an aliquot of the supernatant solution was titrated iodometrically or analyzed by X-ray fluorescence with use of an appropriate calibration curve in order to determine the ferric iron concentration. The ferric iron concentrations and sequestering agent concentrations found in p.p.m. were converted to a weight basis and expressed as pounds of iron sequestered by 100 lbs. of sequestering agent.

The following table illustrates the ability of the sequestering agents of the instant invention to sequester $Fe^{III}$ effectively over a wide range of pH conditions.

TABLE 2

| pH | Pounds of iron sequestered by 100 pounds of sequestering agent ||
| | A* | B* |
| --- | --- | --- |
| 10.65 | 2.4 | 1.8 |
| 10.05 | 17.2 | 12.6 |
| 10.00 | 19.8 | 14.6 |
| 9.70 | 16.9 | 12.4 |
| 9.50 | 21.3 | 15.7 |
| 8.30 | 18.8 | 13.8 |
| 8.10 | 21.3 | 15.7 |
| 7.30 | 19.4 | 14.4 |
| 6.70 | 20.5 | 15.0 |
| 6.30 | 21.3 | 15.7 |
| 5.90 | 21.3 | 15.7 |
| 4.90 | 20.4 | 15.0 |
| 4.50 | 18.6 | 13.6 |
| 4.05 | 11.9 | 8.8 |

A*—amino tri(methylphosphonic acid).
B*—pentasodium amino tri(methylphosphonate).

As can be observed from the above table the sequestering agents of the instant invention are quite effective over a wide pH range and in both an acidic and alkaline solution. It can, therefore, be appreciated that these sequestering agents are capable of being used in many and varied applications.

The following table compares other well known organic sequestering agents to a sequestering agent of the instant invention in sequestering $Fe^{III}$ over a wide range of pH conditions.

TABLE 3

| pH | Pounds of iron sequestered by 100 pounds of sequestering agent |||||
| | A* | B* | C* | D* | E* |
| --- | --- | --- | --- | --- | --- |
| 10.5 | 9.8 | 5.0 | .3 | 0 | 2.6 |
| 10.0 | 14.6 | 12.5 | .6 | .3 | 1.6 |
| 9.5 | 15.7 | 15.0 | 1.1 | 1.5 | 1.2 |
| 9.0 | 14.2 | 15.7 | 1.7 | 3.2 | 1.0 |
| 8.0 | 15.7 | 16.3 | 4.0 | 8.8 | 1.5 |
| 7.0 | 15.0 | 16.4 | 8.9 | 13.0 | 3.5 |
| 6.0 | 15.7 | 16.5 | 17.3 | 14.3 | 4.5 |
| 5.0 | 15.0 | 16.5 | 18.0 | 14.7 | 5.0 |

A*—penta sodium aminotri(methylphosphonate).
B*—disodium ethylene diaminetetracetate·2H$_2$O.
C*—trisodium nitrilo-triacetate·H$_2$O.
D*—sodium citrate.
E*—potassium gluconate.

From the above table it can be observed that a sequestering agent of the instant invention, penta sodium amino tri(methylphosphonate) is equally as effective as the widely used organic sequestering agents under comparison and, also, the novel sequestering agent exhibits effectiveness over a wide range of pH conditions. This, of course, is highly advantageous in permitting its use in many and varied applications.

Other phosphonic acids, such as those disclosed in U.S. Patents 2,599,807, issued June 10, 1952, to Bersworth, and 2,917,528, issued December 15, 1959 to Ramsey et al., are known as sequestering agents. Bersworth found that the sequestering ability of the tetra methylene phosphonic acid, that is, compounds having four CH$_2$P(O)(OH) groups, were superior in sequestering ability to the di and tri methylene phosphonic acids, that is, compounds having two and three CH$_2$P(O)(OH)$_2$ groups. This is believed true because in theory the phosphonic groups are responsible for sequestering the metal through the formation of P—O-metal bonds from the P—O—H bonds. In theory also is the belief that the residual valencies of the amino nitrogens aid in sequestering the metal. Therefore, Bersworth found that compounds, such as $$(CH_2)_2-[N-(CH_2-\overset{O}{\overset{\|}{P}}=(OH)_2)_2]_2$$

and having four phosphonic acid groups and two amino nitrogens were good sequestering agents. Quite surprisingly and totally unexpected it was found that the sequestering agents of the instant invention and having three phosphonic acid groups and only one amino nitrogen were outstandingly better in their ability to sequester $Fe^{III}$ than compounds of either of the foregoing patents. It is not known precisely why this is so, but in theory it may be attributable to the balanced molecule, that is, three phosphonic acid groups balanced around one amino nitrogen.

The following table compares representative compounds of the two previously mentioned patents and amino tri(methylphosphonic acid) in their ability to sequester $Fe^{III}$ at various pH conditions.

TABLE 4

| Compound | Pounds of iron sequestered by 100 pounds of sequestering agent ||
| | pH 8.2 | pH 10.3 |
| --- | --- | --- |
| (1) OHCH$_2$CH$_2$N[CH$_2$PO(OH)$_2$]$_2$ | 0.1 | 0 |
| (2) (CH$_2$)$_2$[N(CH$_2$PO(OH)$_2$)$_2$]$_2$ | 6.0 | 4.3 |
| (3) N[CH$_2$PO(OH)$_2$]$_3$ | 15.0 | 11.0 |

As can be observed from the above table, the sequestering agent of the instant invention (3) is far superior to (1) and (2) in its effectiveness as a sequestering agent on a weight basis. The above results are truly surprising in view of the prior art knowledge.

The sequestering agents of the instant invention are quite effective in sequestering other heavy metal ions in aqueous solutions. As being illustrative, a test was conducted in which 10 mg. of penta sodium amino tri(methylphosphonate) were dissolved in 100 ml. of water. The pH was adjusted to 9 and maintained with caustic. The following amounts of cations were added before a perceptible precipitate was noticed.

TABLE 5

| metal | Metal sequestered (in mg.) per 10 mg. of sequestering agent |
|---|---|
| $Al^{+++}$ | 17.1 |
| $Co^{++}$ | 25.1 |
| $Fe^{+++}$ | 6.5 |
| $Ni^{++}$ | 8.6 |
| $Mn^{++}$ | 14.8 |
| $Cu^{++}$ | 18.9 |

It should be noted that other heavy metal ions capable of being sequestered by the sequestering agents of the instant invention are: $Fe^{++}$, lead, titanium, chromium and the like.

From the foregoing, it can be appreciated that the sequestering agents of the instant invention are effective over a wide range of pH conditions and in both an acid and alkaline solution which renders their use highly desirable in many and varied applications. Therefore, the present invention is intended to be construed in its broadest form limited only by the appened claims.

What is claimed is:
1. A method of inhibiting the precipitation of heavy metal cations from an aqueous solution containing said cations which comprises incorporating therein a sequesterant selected from the group consisting of amino tri(lower alkylidenephosphonic acids) and their water soluble salts.
2. A method of inhibiting the precipitation of heavy metal cations from an aqueous solution having a pH within the range of 4 to 10.5 and containing said cations which comprises incorporating therein heavy metal-sequestering quantities of a sequesterant selected from the group consisting of amino tri(lower alkylidenephosphonic acids) and their water soluble salts.
3. The method of claim 2 wherein the heavy metal cation is iron.
4. A method of inhibiting the precipitation of heavy metal cations from an aqueous solution having a pH within the range of 4 to 10.5 and containing said cations which comprises incorporating therein heavy metal-sequestering quantities of an amino tri(lower alkylidenephosphonic acid).
5. The method of claim 4 wherein the heavy metal cation is iron.
6. The method of claim 4 wherein the amino tri(lower alkylidenephosphonic acid) is amino tri(methylphosphonic acid).
7. A method of inhibiting the precipitation of heavy metal cations from an aqueous solution having a pH within the range of 4 to 10.5 and containing said cations which comprises incorporating therein heavy metal-sequestering quantities of a water soluble alkali metal salt of an amino tri(lower alkylidenephosphonic acid).
8. The method of claim 7 wherein the heavy metal cation is iron.
9. The method of claim 7 wherein the water soluble alkali metal salt of an amino tri(lower alkylidenephosphonic acid) is penta sodium aminotri(methylphosphonate).

References Cited by the Examiner

UNITED STATES PATENTS

| 2,599,807 | 6/1952 | Bersworth | 260—438 |
| 2,841,611 | 7/1958 | Bersworth | 260—500 |
| 2,917,528 | 12/1959 | Ramsey et al. | 260—438 |
| 2,976,248 | 4/1961 | Otrhalek | 252—156 |
| 3,060,127 | 10/1962 | Buckler et al. | 252—175 |
| 3,160,632 | 12/1964 | Toy et al. | 260—268 |

OTHER REFERENCES

Petrov et al.: "Synthesis of Amino Diphosphonates and Amino Tri Phosphonates," Chemical Abstracts, vol. 54 (1960), page 260.

MORRIS O. WOLK, *Primary Examiner.*